United States Patent [19]
Umetsu

[11] Patent Number: 5,923,149
[45] Date of Patent: Jul. 13, 1999

[54] CHARGING APPARATUS

[75] Inventor: Koji Umetsu, Miyagi, Japan

[73] Assignee: Sony Corporation, Japan

[21] Appl. No.: 08/887,609

[22] Filed: Jul. 3, 1997

[30] Foreign Application Priority Data

Jul. 16, 1996 [JP] Japan .................................. 8-204141

[51] Int. Cl.⁶ ............................. H02J 7/00; H02J 7/14
[52] U.S. Cl. ......................... 320/139; 320/133; 320/141; 320/139; 320/162
[58] Field of Search .................................. 320/139, 141, 320/145, 162, 151, 143, 133

[56] References Cited

U.S. PATENT DOCUMENTS

| | | | |
|---|---|---|---|
| 5,172,044 | 12/1992 | Sasaki et al. ........................... | 320/160 |
| 5,237,259 | 8/1993 | Sanpei . | |
| 5,408,170 | 4/1995 | Umetsu et al. ......................... | 320/148 |
| 5,442,274 | 8/1995 | Tamai . | |
| 5,625,273 | 4/1997 | Fehling et al. .......................... | 320/136 |
| 5,637,981 | 6/1997 | Nagai et al. ............................. | 320/160 |
| 5,726,554 | 3/1998 | Freiman et al. . | |

FOREIGN PATENT DOCUMENTS 0 847 123 A1  11/1997  European Pat. Off. .
2-119538  5/1990  Japan .
8-070536  3/1996  Japan .
2247366  2/1992  United Kingdom .

*Primary Examiner*—Peter S. Wong
*Assistant Examiner*—Gregory J. Toatley, Jr.
*Attorney, Agent, or Firm*—Rader, Fishman & Grauer; Ronald P. Kananen

[57] ABSTRACT

A charging apparatus controls the charging of a secondary battery such that charging is performed using a constant current as long as a terminal voltage of the secondary battery is less than a threshold voltage. When the terminal voltage rises to the threshold voltage, charging is performed using a constant voltage that is equal to or less than the threshold voltage. The charging apparatus includes a switch for shutting off the charge current at a predetermined time; a comparator for comparing (1) a voltage difference between an output voltage of a power source at the time of the shut-off of the charge current and a secondary battery voltage with (2) a reference voltage; and control means for (1) switching a charge voltage to a voltage higher than the output voltage of the power source when the charge current is supplied, (2) switching the charge voltage to a voltage equal to the output voltage of the power source when the charge current is shut off, and (3) switching the charge voltage to a voltage equal to the output voltage of the power source when the charging is finished in accordance with the output of the comparator.

4 Claims, 10 Drawing Sheets

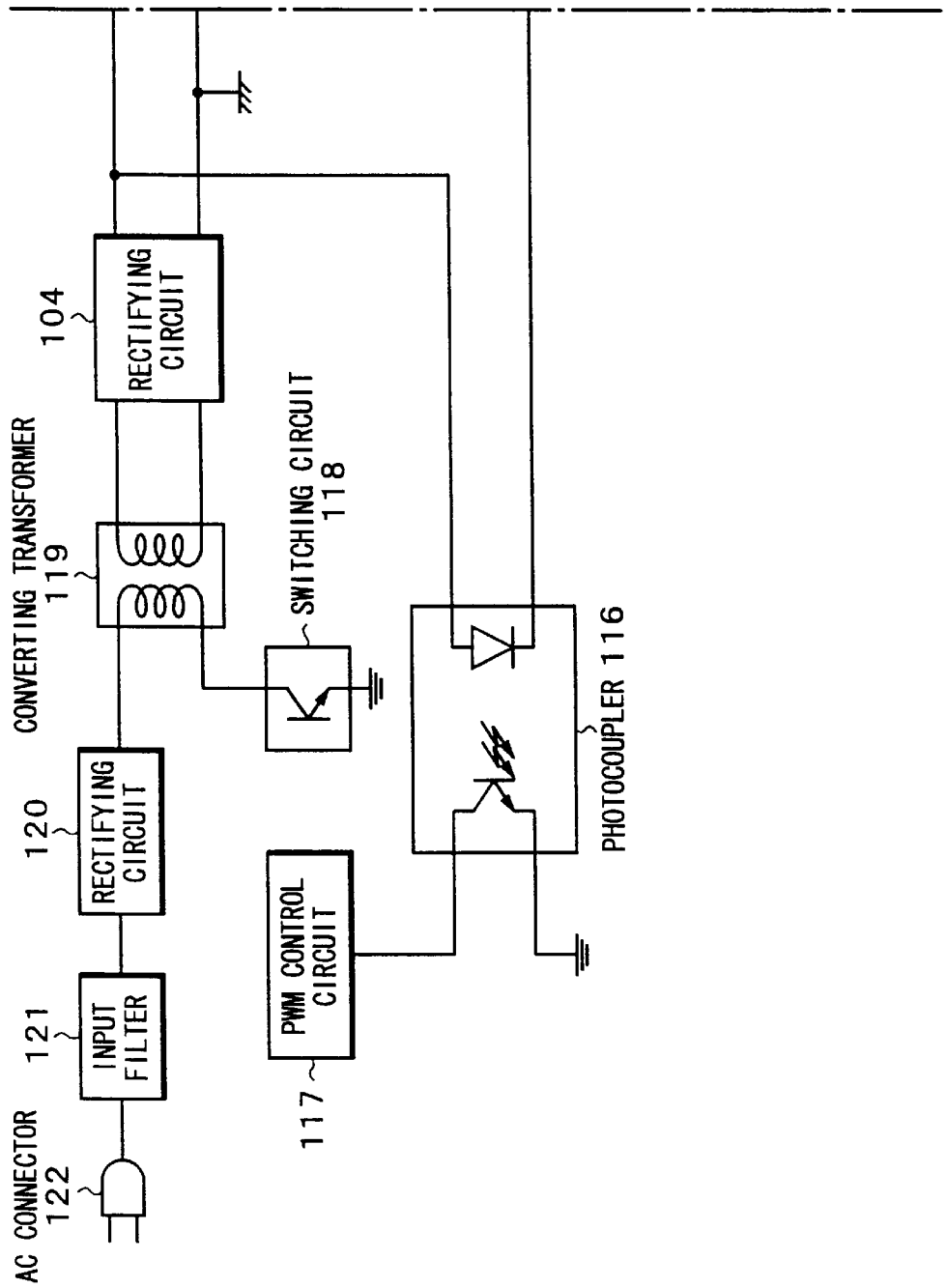

CHARGING APPARATUS

BACKGROUND OF THE INVENTION

1. Field of the Invention

The invention relates to a charging apparatus for charging a secondary battery.

2. Description of the Related Art

A charging apparatus typically charges a secondary battery, such as a lithium battery or the like, using a constant current charge followed by a constant voltage charge. FIG. 3 illustrates the charging process. When a battery voltage of the secondary battery is equal to or less than a set voltage of the charging, the battery is charged by a constant charge current and the battery voltage is raised. This portion of the charging process is depicted at the segment of FIG. 3 labeled "constant current charge." When the battery voltage reaches the set voltage, the charge current decreases and the battery is charged by a constant charge voltage, as illustrated by the segment of FIG. 3 labeled "constant voltage charge."

FIG. 1 illustrates a conventional charging apparatus P. In the charging apparatus 10, a secondary battery 11 and a current detecting resistor 12 are serially connected to a power source 13. That is, a positive terminal of the secondary battery 11 is connected to a positive terminal of the power source 13, a negative terminal of the secondary battery 11 is connected to one end of the current detecting resistor 12, and the other end of the current detecting resistor 12 is connected to a negative terminal of the power source 13. Positive and negative input terminals of a comparator 14 are connected to both ends of the current detecting resistor 12. An output terminal of the comparator 14 is connected to a charge control unit 15, which is also connected to a display unit 16. FIG. 2 illustrates the relationship between charge current and charge voltage in the charging apparatus P.

As illustrated in FIG. 3, in such a construction, at the last stage of the charging of the secondary battery 11, after the charging by a constant current Ib1 was finished, the charging by a constant voltage Vb1 is started, so that the charge current I decreases. The current detecting resistor 12 detects the charge current I, and the comparator 14 compares the detected charge current I with a current set by a reference voltage E1 and outputs a detection signal to the charge control unit 15. If the detection signal is at the high level, the charge control unit 15 determines that the charging should continue and causes the display unit 16 to indicate that the battery is being charged. On the other hand, if the detection signal is at the low level, the charge control unit 15 determines that charging is finished, and causes the display unit 16 to indicate this status.

In the conventional charging apparatus 10, the speed with which the battery is charged is limited. In particular, the constant voltage charging time is determined by an impedance in the secondary battery. As a result, the time required to charge by the constant voltage is 3t, where t is the amount of time required to charge by the constant current. Thus, the total charge time is 4t. To reduce the charging time, it is necessary to increase the charge current of the constant current charge. Still, the constant voltage charging time occupies ¾ of the charging time and cannot be reduced. Moreover, the high output (high electric power) apparatus required to charge the secondary battery using a higher constant current is relatively expensive.

OBJECT AND SUMMARY OF THE INVENTION

The invention is made to solve the above problems and it is an object of the invention to provide an inexpensive charging apparatus that can charge a secondary battery in a short time.

To accomplish the above object, according to the invention, a charging apparatus controls the charging process such that the secondary battery is initially charged using a constant current as long as a terminal voltage of the second battery is less than a threshold voltage. When the terminal voltage increases to the threshold voltage, it is charged using a constant voltage that is equal to or less than the threshold voltage. The charging apparatus comprises: switching means for shutting off the charge current at a certain time; comparing means for comparing a voltage difference between an output voltage of a power source at the time of the shut-off of the charge current and a secondary battery voltage with a reference voltage; and control means for switching a charge voltage to a voltage higher than the output voltage of the power source when the charge current is supplied, switching the charge voltage to a voltage equal to the output voltage of the power source when the charge current is shut off, and switching the voltage to the same voltage as the first voltage when the charging is finished in accordance with the comparison result.

According to the above construction, only when the charge current is not shut off, namely, only during the charging, the voltage is switched to the voltage higher than the output voltage of the power source and the charging is performed, so that the constant voltage charging time which occupies ¾ of the charging time can be reduced.

The above and other objects and features of the present invention will become apparent from the following detailed description and the appended claims with reference to the accompanying drawings.

BRIEF DESCRIPTION OF THE DRAWINGS

FIGS. 4A and 4B are schematic diagrams showing an example of a charging apparatus, according to an embodiment of the invention;

DETAILED DESCRIPTION OF THE PREFERRED EMBODIMENTS

A preferred embodiment of the invention will now be described in detail hereinbelow with reference to the drawings.

Since the embodiment which will be described hereinbelow is the preferred embodiment of the invention, various features which are technically preferred are added. However, the scope of the invention is not limited to those embodiments so long as there is no disclosure indicating that the invention is particularly limited in the following description.

Figure 4B:
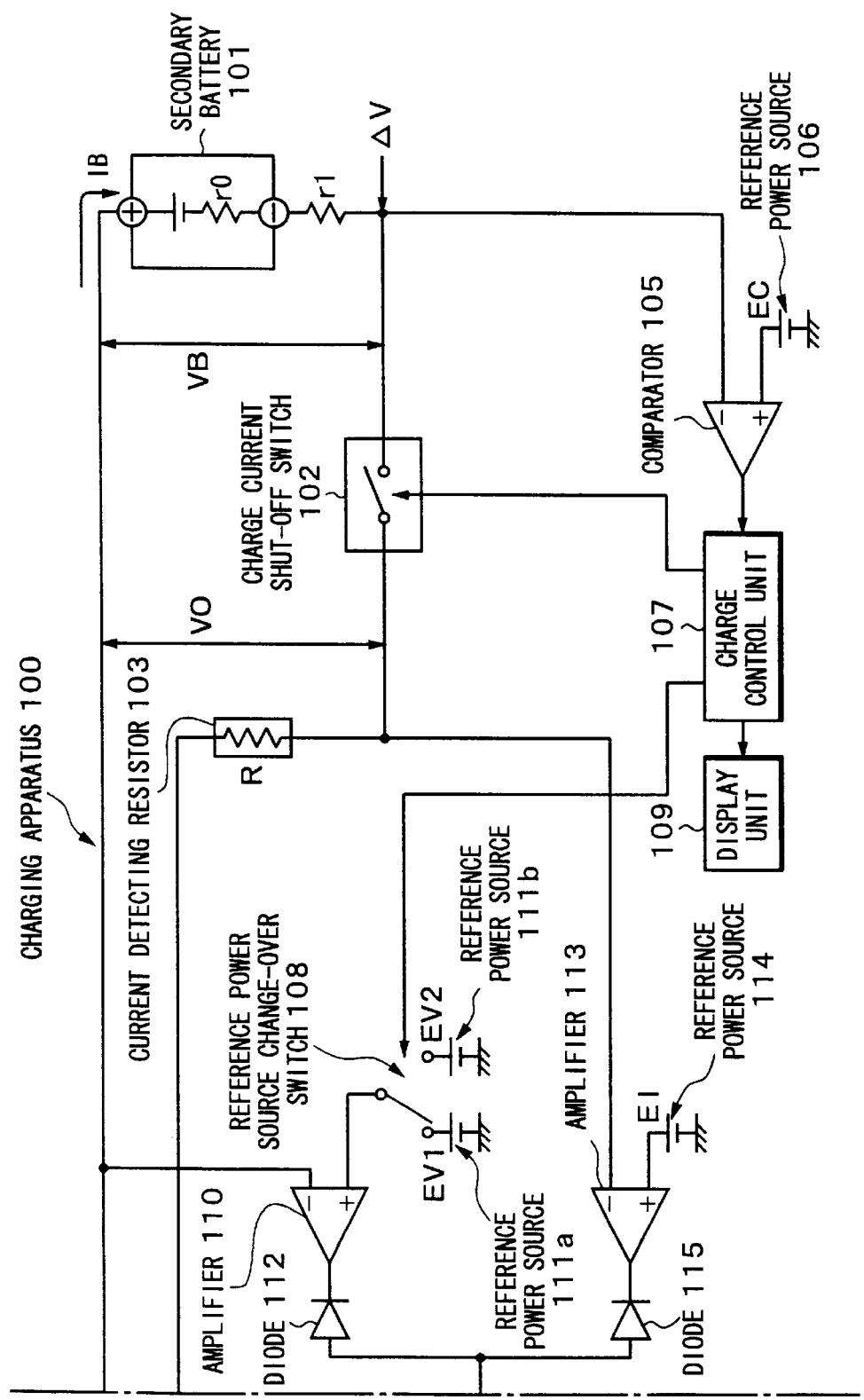

FIGS. 4A and 4B are schematic diagrams showing an example of a charging apparatus, according to a particular embodiment of the invention.

In a charging apparatus 100, a secondary battery 101, a charge current shut-off switch 102, and a current detecting resistor 103 are serially connected to a rectifying circuit 104. That is, a positive terminal of the secondary battery 101 is connected to the rectifying circuit 104, a negative terminal of the secondary battery 101 is connected to one end of the charge current shut-off switch 102, the other end of the charge current shut-off switch 102 is connected to one end of the current detecting resistor 103, and the other end of the current detecting resistor 103 is connected to the rectifying circuit 104. Further, the negative terminal of the secondary battery 101 is connected to a positive input terminal of a comparator 105. A positive terminal of a reference power source 106 is connected to a negative input terminal of the comparator 105. An output terminal of the comparator 105 is connected to a charge control unit 107. The charge current shut-off switch 102, a reference power source change-over switch 108, and a display unit 109 are connected to the charge control unit 107.

A connecting line portion between the positive terminal of the secondary battery 101 and the rectifying circuit 104 is connected to a negative input terminal of an amplifier 110. A terminal of the reference power source change-over switch 108 for switching reference power sources 111a and 111b is connected to a positive input terminal of the amplifier 110. An output terminal of the amplifier 110 is connected to a diode 112.

A connecting line portion between the charge current shut-off switch 102 and current detecting resistor 103 is connected to a negative input terminal of an amplifier 113. A positive terminal of a reference power source 114 is connected to the negative input terminal of the amplifier 113. An output terminal of the amplifier 113 is connected to a diode 115.

A connecting line portion between the diodes 112 and 115 and a connecting line portion between the positive terminal of the secondary battery 101 and the rectifying circuit 104 are connected to a photocoupler 116. The photocoupler 116, a PWM control circuit 117, and a switching circuit 118 are serially connected.

A rectifying circuit 120 and an input filter 121 are serially connected to one terminal on the primary side of a converting transformer 119. The switching circuit 118 is connected to the other terminal on the primary side. The rectifying circuit 104 is connected to the secondary side of the converting transformer 119.

Figure 1:
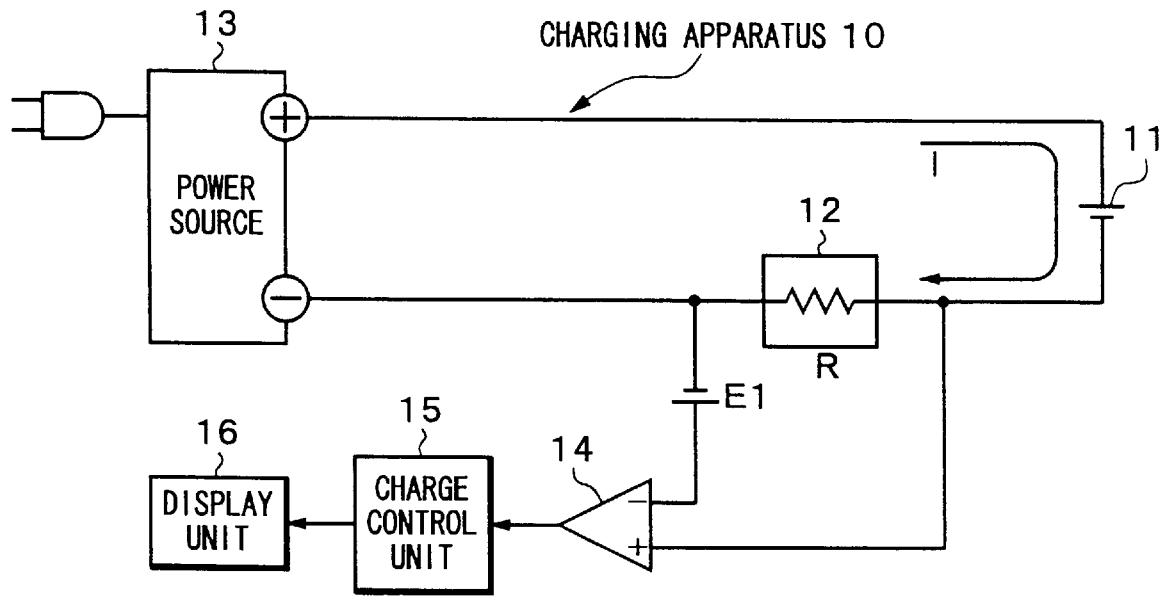
FIG. 1 is a schematic diagram showing an example of a conventional charging apparatus.
Figure 2:
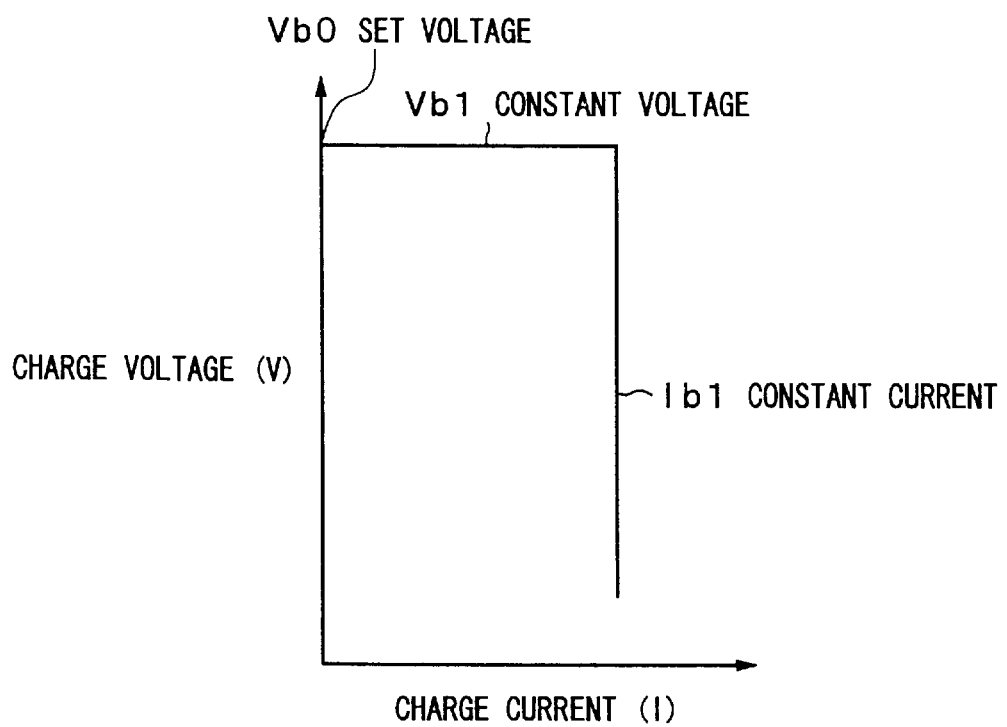
FIG. 2 is a diagram showing a general relationship (output characteristics of the charging apparatus) between an output voltage and a charge current.
Figure 3:
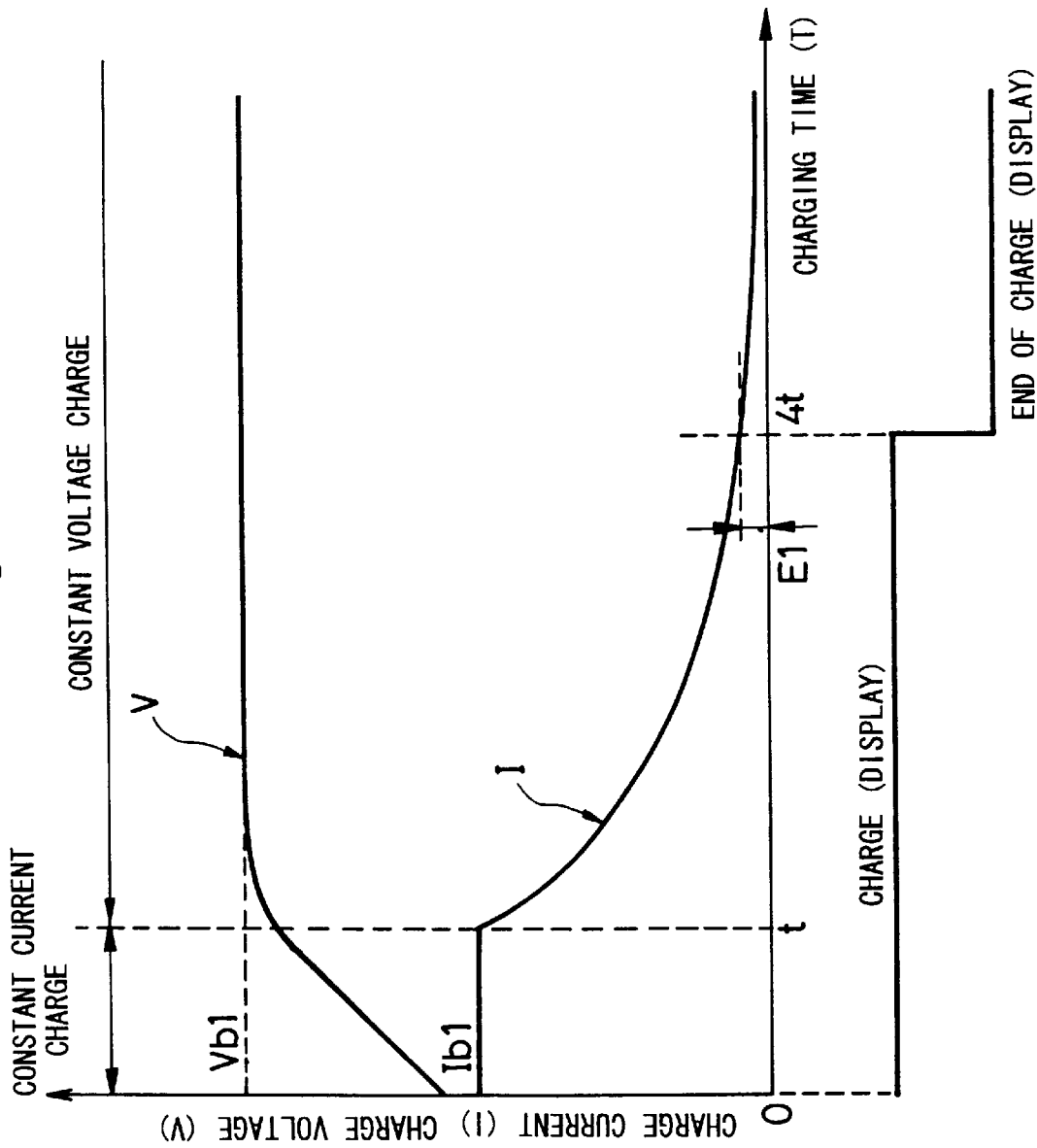
FIG. 3 is a diagram showing relationships (charging characteristics curves) among the charge voltage/current and the like and a charging time of the charging apparatus shown in FIG. 1.

A method of reducing a charging time by the charging apparatus 100 of the embodiment of the invention will now be described. Since an output voltage of the power source 13 is always constant in the conventional charging apparatus 10 of FIG. 1, when a charging mode enters a constant voltage charging after completion of a constant current charging, a decrease in charge current occurs.

The decrease in charge current is determined by an internal voltage of the secondary battery 11, an internal resistance of the secondary battery 11, and a wiring resistance between the secondary battery 11 and charging apparatus 10. A decrease in the charge current also occurs even in the charging apparatus 100 of the embodiment of the invention. For example, assuming that an internal resistance r0 of the secondary battery 101 of FIG. 4B is equal to 0.3 Ω and a wiring resistance r1 between the secondary battery 101 and charging apparatus 100 is equal to 0.1 Ω, a total resistance r=r0+r1 is equal to 0.4 Ω. Assuming that a charge current IB is set to 1A, a voltage drop Vr=r·IB is equal to 0.4V. The voltage drop Vr also exerts an influence on the charge current IB to the secondary battery 101.

Assuming that the battery voltage is, for example, equal to 8.4V, a lithium battery serving as a secondary battery 101 enters a full charging state by limitlessly charging to 8.4V by a battery releasing voltage VB. Therefore, by decreasing the internal resistance r0 of the secondary battery 101 and the wiring resistance r1 between the secondary battery 101 and charging apparatus 100, the charging time can be reduced.

As mentioned above, in the charging apparatus 100 of the embodiment of the invention illustrated in FIGS. 4A and 4B, the charging and the non-charging cycles are repeated at predetermined periods. The battery is alternatively charged by the conventional charge voltage, namely, an output voltage V0 of the power source, for example, and a charge voltage V01 higher than 8.4V, for instance, 8.7V. The voltage is returned to the output voltage V0 of the power source, for example, 8.4V during the non-charging cycle, thereby reducing the whole charging time.

Figure 5:
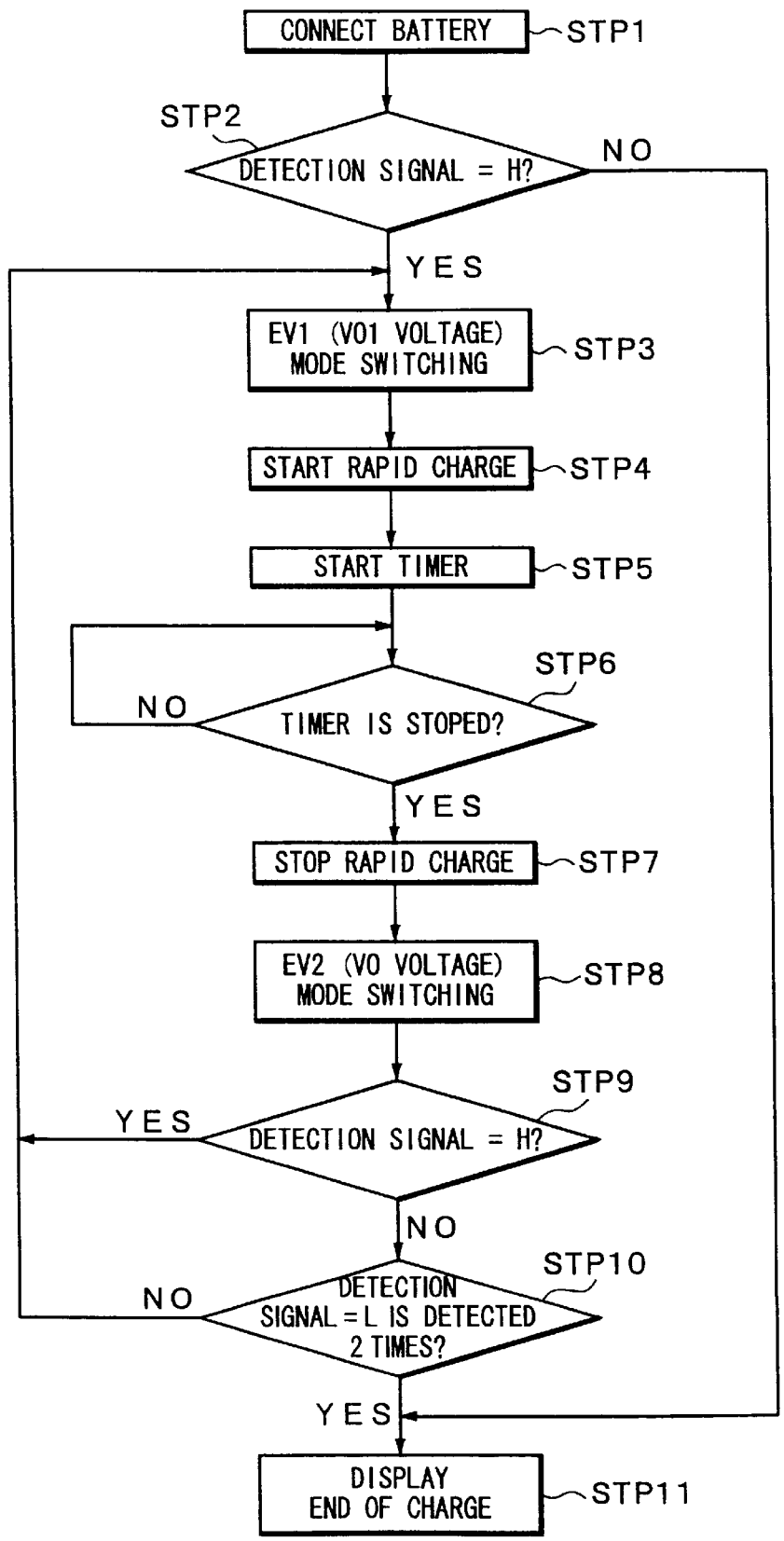
FIG. 5 is a flowchart illustrating the operation of the charging apparatus shown in FIGS. 4A and 4B.
Figure 6:
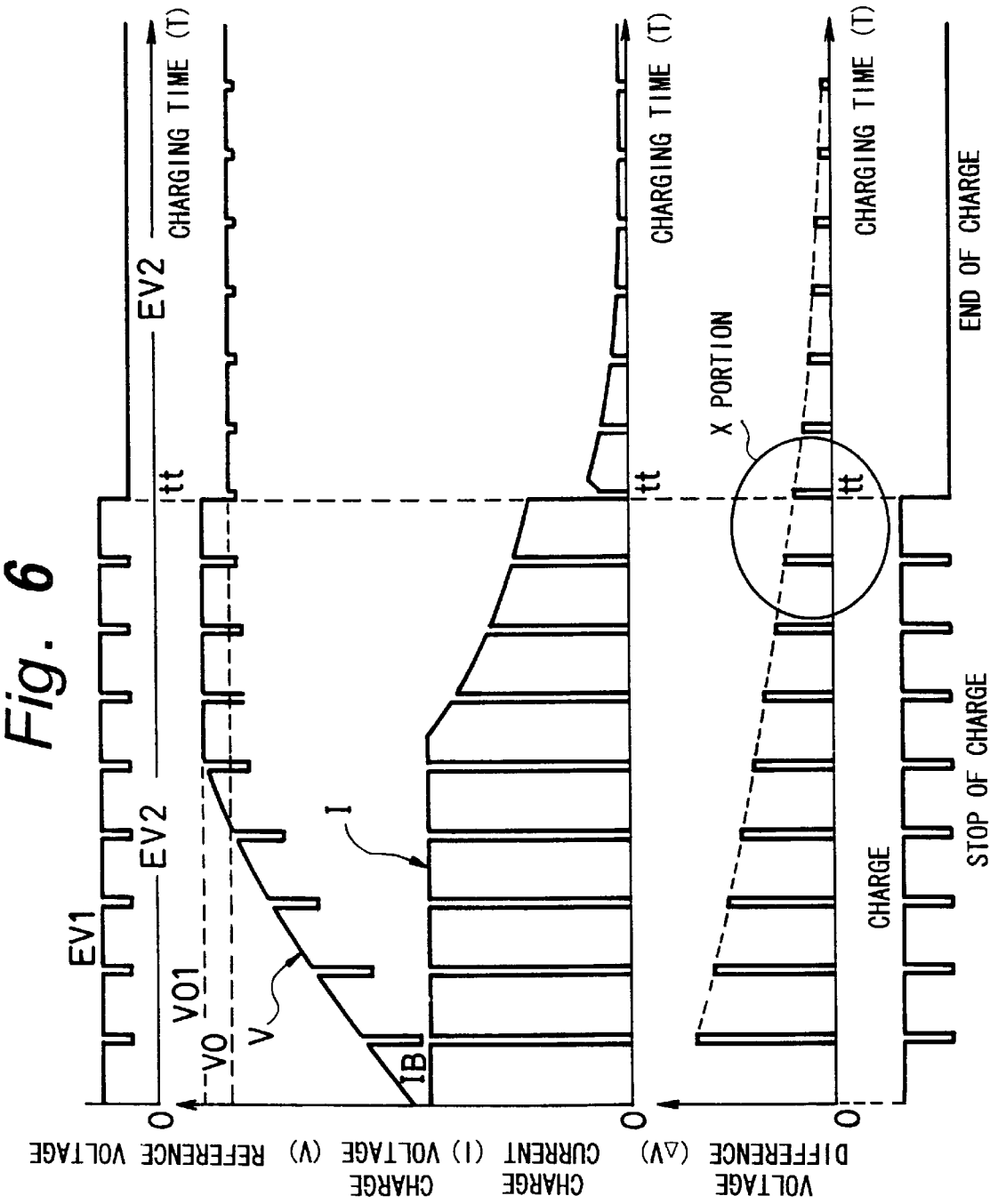
FIG. 6 is a diagram showing relationships (charging characteristics curves) among charge voltage/current and the like and a charging time of the charging apparatus shown in FIGS. 4A and 4B, according to another embodiment of the present invention.
Figure 7:
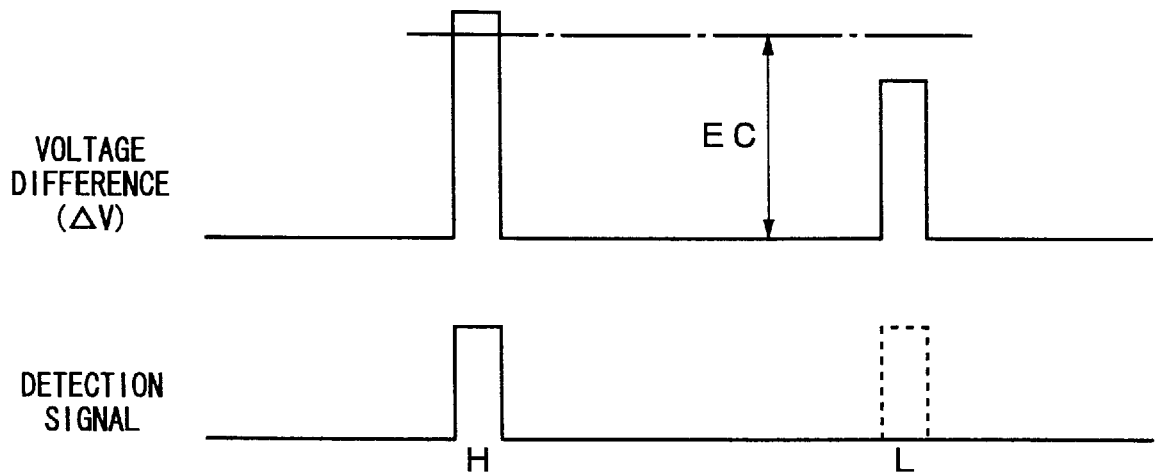
FIG. 7 is an enlarged view of the portion labeled "X portion" in FIG. 6.
Figure 8:
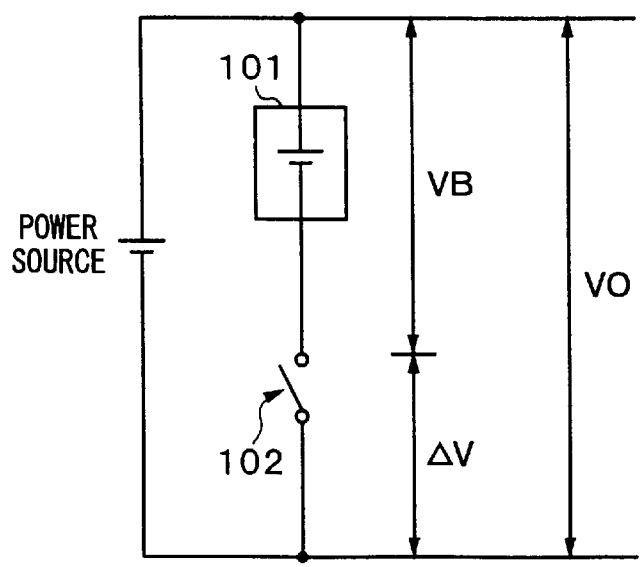
FIG. 8 is a schematic diagram showing a voltage section of the charging apparatus shown in FIGS. 4A and 4B.

In the construction described above, an operation example will now be explained with reference to a flowchart of FIG. 5, a diagram of FIG. 6 showing relations (charging characteristics curves) among a voltage EV1 or EV2 of the reference power source 111a or 111b, the charge voltage V, the charge current I, a voltage difference ΔV, and the charging time T, an enlarged diagram of the area labeled "X" portion in FIG. 7, and a diagram showing a voltage section of FIGS. 4A and 4B in FIG. 8.

At a Step STP1 of FIG. 5, secondary battery 101 is first connected, an AC connector 122 is connected to an A/C power source (100ACV), and electric power is supplied to the primary side of the converting transformer 119 through the input filter 121 and rectifying circuit 120. The switching circuit 118 switches the converting transformer 119 by a method that will be explained in detail below, converts an electric power from the primary side to the secondary side, and supplies the converted power to the secondary battery 101 through the rectifying circuit 104.

The comparator 105 compares the voltage difference ΔV between the output voltage V0 of the power source at the time of no-lead that is inputted to a positive input terminal when the charge current is shut off and the releasing battery voltage VB, namely, the negative terminal voltage of the secondary battery 101 with a reference voltage EC of the reference power source 106 that is inputted to the negative input terminal and outputs direction signal to the charge control unit 107.

When the detection signal is at the low level, the charge control unit 107 determines that the charging is finished, allows the display unit 109 to indicate the end of charging process, and finishes the charging operation as depicted at steps STP2, STP11.

When the detection signal is at the high level, the charge control unit 107 determines that the charging operation should be continued, switches the reference power source change-over switch 108 to the reference power source 111a side, namely, to a charge voltage EV1 higher than the output voltage V0 of the power source, and allows the display unit 109 to indicate that the charging operation is being performed as indicated at steps STP2, STP3.

The amplifier 110 compares the voltage V0 that is supplied to the secondary battery 101 with the voltage EV1 of the reference power source 111a. The amplifier 113 compares the charge current IB flowing in the secondary battery 101 detected by the current detecting resistor 103 with a current that is set by the voltage EI of the reference power source 114. The photocoupler 116 converts the output of the amplifiers 110 and 113 added by the diodes 112 and 115 from the secondary side to the primary side and outputs the converted output to the PWM control circuit 117. On the basis of a voltage/current control signal from the photocoupler 116, the pulse width modulator control circuit 117 controls an on-period of the switching circuit 118 in a manner such that the output voltage and the charge current are equal to predetermined set values, namely, the voltage (output V01 of the power source)/current that are set by the voltage EV1 of the reference power source 111a and the voltage EI of the reference power source 114. Thus, constant voltage/constant current output characteristics can be derived.

The charge control unit 107 starts the rapid charge and starts the timer as depicted at steps STP4, STP5. When the timer stops, the rapid charge is stopped, as illustrated at steps STP6, STP7. That is, the charge control unit 107 controls the on/off operations of the charge current shut-off switch 102 at a predetermined period or an arbitrary period after the start of the rapid charge. For example, the operations in which the charge current shut-off switch 102 is turned on only for three minutes after the start of the rapid charge, the charge current is supplied. Next, the charge current shut-off switch 102 is turned off for only a period of a few seconds to tens of seconds after three minutes have passed, causing the charge current to be shut off. This cycle is repeated.

During the non-charging cycle, the charge control unit 107 switches the reference power source change-over switch 108 to the reference power source 111b side, namely, to the same charge voltage EV2 as the output voltage V0 of the power source, as depicted at steps STP8 of FIG. 5.

The amplifier 110 compares the voltage V0 that is supplied to the secondary battery 101 with the voltage EV2 of the reference power source 111b and supplies an output signal to the PWM control circuit 117 via the photocoupler 116 so as to control to the power output voltage V0. The PWM control circuit 117 controls the on period of the switching circuit 118. Thus, the output voltage of the power source is set to V0.

The comparator 105 compares the voltage difference ΔV between the output voltage V0 of the power source at the time of no-load that is inputted to the positive input terminal when the charge current is shut off and the releasing battery voltage VB, namely, the negative terminal voltage of the secondary battery 101 with the reference voltage EC of the reference power source 106 that is inputted to the negative input terminal and outputs a detection signal to the charge control unit 107.

When the detection signal is at the high level, the charge control unit 107 determines that the charging operation should be continued, the processing routine is returned to step STP3, and the foregoing processes are repeated, as illustrated at step STP9.

Figure 9:
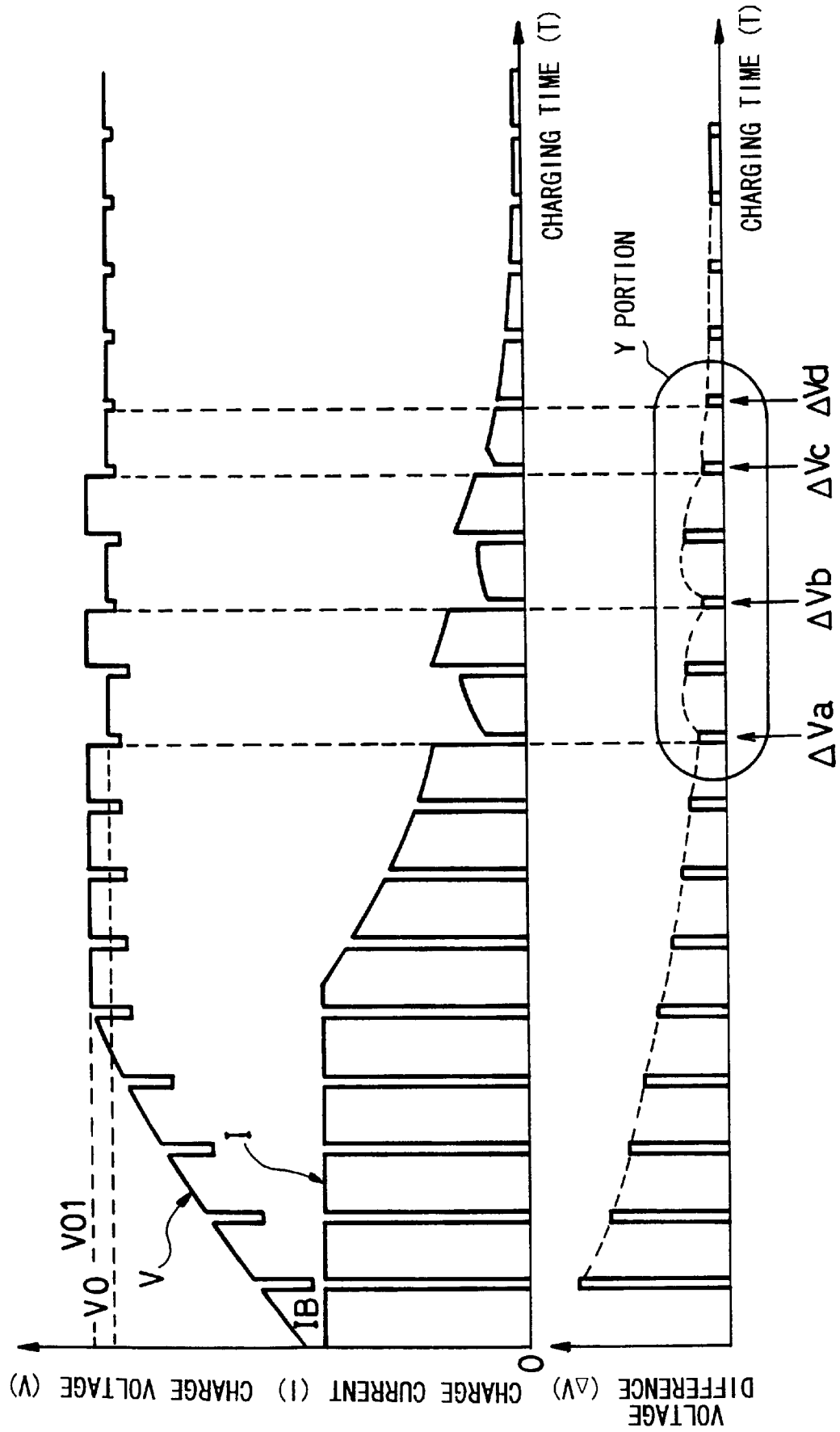
FIG. 9 is another diagram showing relationships (charging characteristics curves) among the charge voltage/current and the like and the charging time of the charging apparatus shown in FIGS. 4A and 4B, according to yet another embodiment of the present invention.
Figure 10:
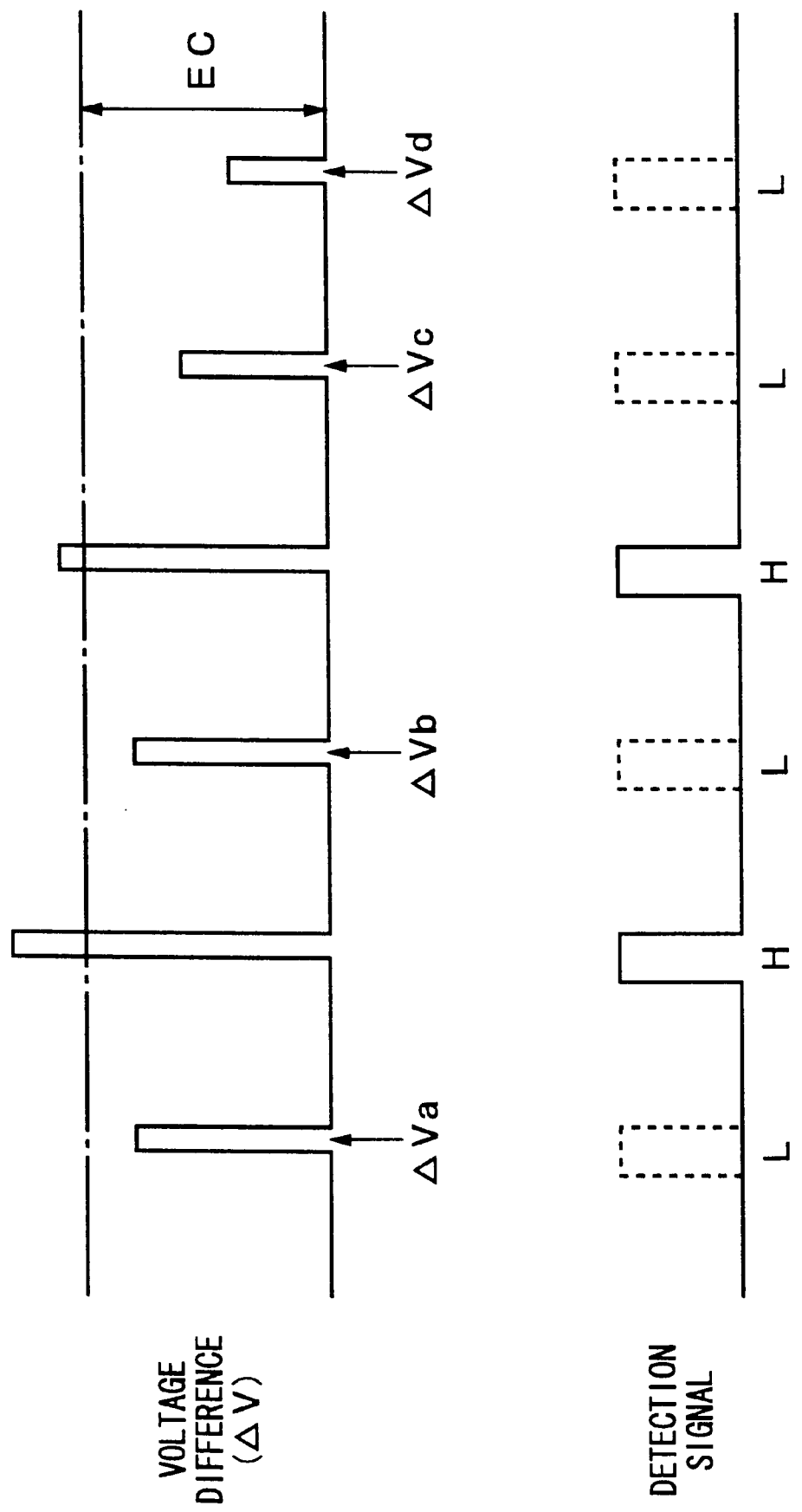
FIG. 10 is an enlarged view of the portion labeled "Y portion in FIG. 9.

When the detection signal is at the low level, the charge control unit 107 can also decide that the charging operation is finished. However, after the voltage difference ΔV at which the detection signal is set to the low level is detected, certain problems may occur. For example, as shown in the diagram indicative of charging characteristics curves in FIG. 9 the portion labeled "Y portion" being illustrated in greater detail in FIG. 10, after a voltage difference ΔVa or ΔVb in which the detection signal of the first time is set to the low level is detected, when the reference voltage is changed from EV1 (V01 voltage)to EV2 (V0 voltage) and the charging operation is continued, the charge current I and voltage difference ΔV which had continuously been decreasing, rise once.

When this phenomenon occurs, if the end of charge is identified by the detection of a voltage difference ΔVa or ΔVb at which the detection signal of the first time is set it to the low level, erroneous identification results. To avoid this erroneous identification of the completion of the charging process, the voltage difference ΔV at which the detection signal is set to the low level is detected at least twice consecutively. Voltage differences ΔVc and ΔVd at which the detection signal is set to the low level are detected. The completion of the charging process is correctly identified.

As a specific operation example, the charge control unit 107 detects the detection signal at the low level for the first time, as depicted at step STP9 of FIG. 5. Next, a check is made to see if the detection signal at the low level has been detected twice, as illustrated at STP10. For example, when the detection signal is detected at the low level a first time, a detection counter is set to "1". When the detection signal is subsequently detected at the high level, the detection counter is reset to "0". Thus, only when the detection signal at the low level is detected twice consecutively, the detection counter is set to "2".

In step STP10, if the detection signal is not detected at the low level twice consecutively, the processing routine is returned to step STP3. The charge voltage is switched to EV1 (V01), and the charging cycle is again performed.

If the detection signal is detected at the low level twice consecutively, the end of charge is indicated, as depicted at STP11. In this instance, by continuously applying the charge voltage EV2 (V0), the charging operation is performed.

While the detection signal is detected at the low level twice consecutively in the above-described embodiment, the invention is not limited to such a method.

The detection signal output from the comparator 105 is valid only for the shut-off period of the charge current I. Therefore, depending on the circuit setting, the output of the detection signal when the charge current I is not shut off is set at either the high or low level.

As mentioned above, although the constant current charging time is prolonged, the constant voltage charging time is reduced. Therefore, for example, with a secondary battery 101 of 1200 mAH, a charging time tt is reduced to approximately half the time, i.e., to about 50 minutes, compared to 90 minutes using a conventional charging apparatus.

Figure 11:
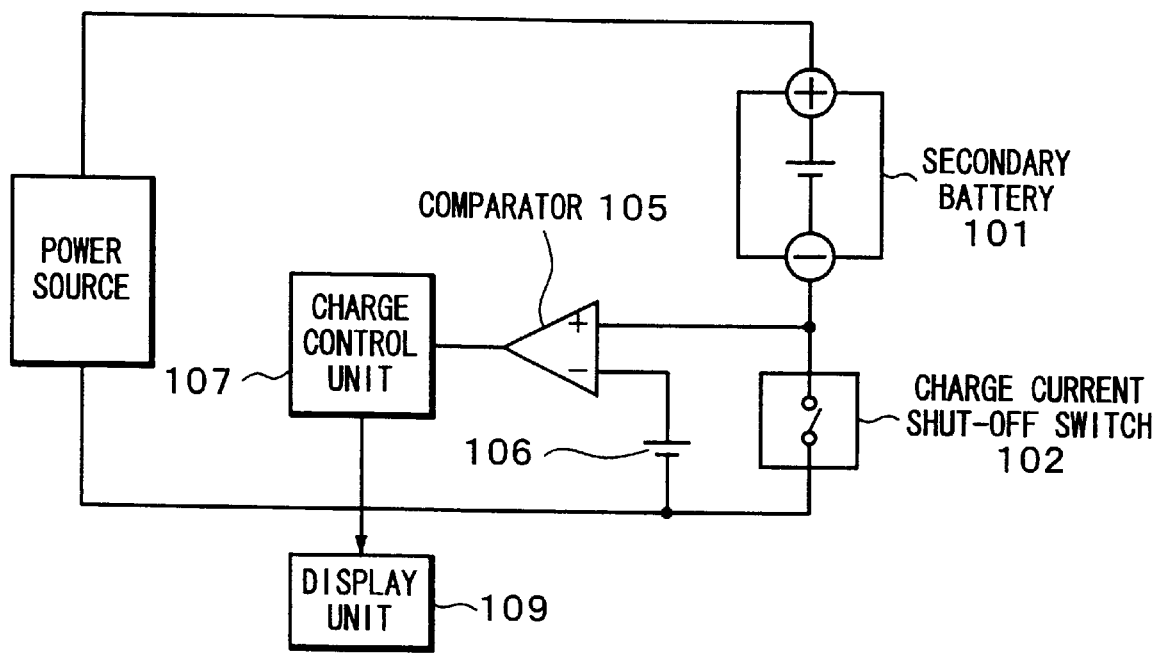
FIG. 11 is a schematic diagram showing an example of a charging apparatus according to yet still another embodiment of the present invention.

FIG. 11 is a schematic diagram showing a construction in which portions other than the main section of the charging apparatus 100 in the embodiment are simplified. With the voltage difference ΔV is set to, for instance, 80 mV, a general-use IC can be used as a comparator 105 to detect the voltage difference ΔV even with a variation of approximately 5 mV in the offset voltage. Since the charge control unit 107 need not detect the analog voltage with high precision, an inexpensive IC of 1 k ROM such as a logic circuit, one-chip microcomputer, or the like can be used. The charging apparatus 100, therefore, can use a general comparator to detect the voltage. A general microcomputer can be used to control the charging operation, reducing the cost of the apparatus.

Figure 12:
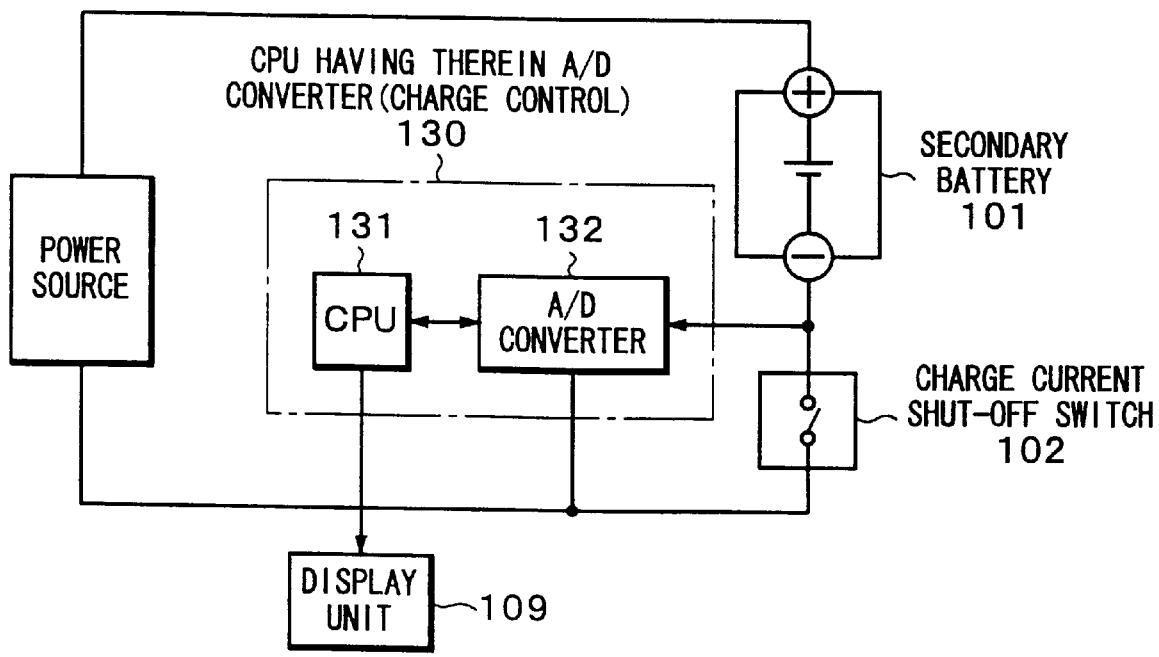
FIG. 12 is a schematic diagram showing an example of a charging apparatus, according to yet another embodiment of the invention.

The detecting means of the voltage differences ΔV is not limited to the comparator 105. As shown in FIG. 12, the detecting means can be implemented in a CPU 130 having an A/D converter 132. The A/D converter 132 and a CPU (microcomputer) 131 are used in place of the comparator 105. The voltage difference ΔV is detected by the A/D converter 132.

As described above, according to the invention, since the construction is simple, the product costs can be reduced. The charging can be performed reliable in a short time.

The present invention is not limited to the foregoing embodiments. Many modifications and variations are possible within the spirit and scope of the appended claims of the invention.

What is claimed is:

1. A charging apparatus for controlling a charging process in a manner such that a secondary battery is initially charged using a constant current as long as a terminal voltage of the secondary battery is less than a threshold voltage and, when the terminal voltage rises to said threshold voltage, the secondary battery is charged using a constant voltage less than said threshold voltage, the charging apparatus comprising:

switching means for shutting off a charge current at a predetermined time;

comparing means for comparing a voltage difference between an output voltage of a power source when the charge current is shut off and a secondary battery voltage with a reference voltage; and control means for switching a charge voltage to a voltage higher than the output voltage of the power source when said charge current is supplied, switching the charge voltage to a voltage equal to the output voltage of the power source when said charge current is shut off, and switching the charge voltage to a voltage equal to the output voltage of the power source when the charging is finished in accordance with an output of the comparing means.

2. A charging apparatus, according to claim 1, wherein said control means finishes the charging process after the output of the comparing means indicates completion of the charging process at least or two times.

3. A charging apparatus for controlling a charging process in a manner such that a secondary battery is initially charged using a constant current as long as a terminal voltage of the secondary battery is less than a threshold voltage and, when the terminal voltage to said threshold voltage, the secondary battery is charged using a constant voltage less than said threshold voltage, wherein the charging is stopped at a predetermined time, when the charging is stopped, a voltage difference between an output voltage of a power source when the charging is stopped and a secondary battery voltage is compared with a reference voltage to yield a comparison result, upon charging, a charge voltage is switched to a voltage higher than the output voltage of the power source, and when the charging is stopped, the charge voltage is switched to a voltage equal to the output voltage of the power source in accordance with the comparison result, and after completion of charging, the charging is continued using a voltage equal to the output voltage of the power source.

4. A charging apparatus, according to claim 3, wherein the charging is finished after a comparison result indicating completion of the charging process is detected at least two times.

* * * * *